Figure 1:
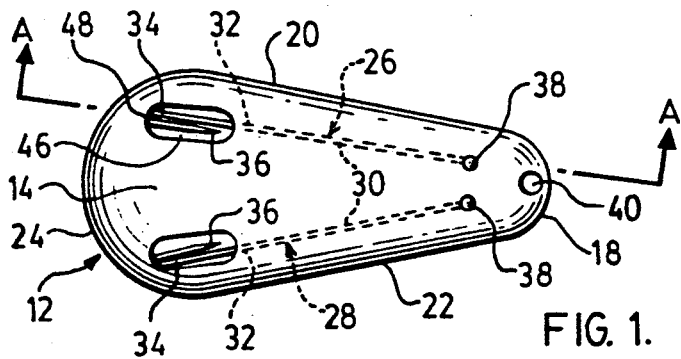

United States Patent [19]
Shaffer

[11] Patent Number: 5,107,615
[45] Date of Patent: Apr. 28, 1992

[54] WEEDLESS FISH LURE

[75] Inventor: Allan E. Shaffer, Alberta, Canada

[73] Assignee: Snagless Lures Inc., Edmonton, Canada

[21] Appl. No.: 544,799

[22] Filed: Jun. 27, 1990

Related U.S. Application Data

[63] Continuation of Ser. No. 349,970, May 8, 1989, abandoned, and a continuation of Ser. No. 151,673, Feb. 3, 1988, abandoned.

[30] Foreign Application Priority Data

Feb. 6, 1987 [GB] United Kingdom ............... 8702730

[51] Int. Cl.$^5$ ........................................ A01K 85/00
[52] U.S. Cl. ........................... 43/42.41; 43/42.5; 43/42.52
[58] Field of Search ............ 43/42.5, 43.2, 43.4, 43/42.41, 42.52

[56] References Cited

U.S. PATENT DOCUMENTS

| 446,827 | 2/1891 | Cass | 43/35 |
|---|---|---|---|
| 2,597,035 | 5/1952 | Rickard | 43/42.5 |
| 2,605,575 | 8/1952 | Ebert | 43/42.52 |
| 2,611,208 | 9/1952 | Alexath | 43/42.52 |
| 2,860,441 | 11/1958 | Castner | 43/42.5 |

FOREIGN PATENT DOCUMENTS

| 82278 | 3/1957 | Denmark | 43/42.41 |
|---|---|---|---|
| 9126 | 10/1955 | Fed. Rep. of Germany | 43/35 |
| 1143358 | 9/1957 | France | 43/42.5 |
| 445272 | 11/1949 | Italy | 43/35 |
| 274149 | 3/1951 | Switzerland | 43/42.41 |
| 3027 | of 1888 | United Kingdom | 43/42.41 |

Primary Examiner—Kurt Rowan
Attorney, Agent, or Firm—Jeffrey T. Imai; Arne I. Fors

[57] ABSTRACT

A weedless fish lure has an elongated spoon-shaped body defining a bulbous outer surface on one side of a complementarily-shaped recess on the other side. The body has a generally longitudinally-extending slot, and at least one resilient hook mounted within the spoon-shaped body recess. The hook has a shank portion at one end and extends therefrom through a medial portion to a pointed portion at the other end. The shank portion is anchored to the spoon-shaped body to position the pointed end portion adjacent the slot so that the pointed end portion is capable of frictional engagement with an end of the slot remote from the shank portion to retain the pointed end portion substantially wholly within the recess with the hook in a resiliently deflected condition in which the medial portion projects from the recess on the other side of the body. The pointed end portion is capable of movement through the slot so as to project in a fish catching manner from the bulbous outer surface of the body when pressure is applied by the mouth of the fish to the projecting medial portion in a direction to overcome the frictional engagement and cause the resiliency of the hook to spring the pointed end portion through the slot to a fish catching position.

4 Claims, 1 Drawing Sheet

WEEDLESS FISH LURE

This invention relates to weedless fish lures, that is to say fish lures which are designed to minimize the likelihood of entanglement with weeds when dragged through the water.

Many such fish lures have been proposed in the past, but for some reason or another none has been particularly satisfactory in practice.

It is therefore an object of the invention to provide an improved weedless fish lure.

According to the invention, a weedless fish lure comprises an elongated spoon-shaped body defining a bulbous outer surface on one side of a complementarily-shaped recess on the other side, the body having a generally longitudinally-extending slot, and at least one resilient hook mounted within the spoon-shaped body recess, the hook having a shank portion at one end and extending therefrom through a medial portion to a pointed portion at the other end. The shank portion is anchored to the spoon-shaped body and the pointed end portion is positioned adjacent the slot so as to be capable of frictional engagement with an end of the slot remote from the shank portion to retain the pointed end portion substantially wholly within the recess with the hook in a resiliently deflected condition in which the medial portion projects from the recess on the other side of the body, and so as to be capable of movement through the slot so as to project in a fish catching manner from the bulbous outer surface of the body when pressure is applied by the mouth of the fish to the projecting medial portion in a direction to overcome said frictional engagement and cause the resiliency of the hook to spring the pointed end portion through the slot to a fish catching position.

Advantageously, a pair of said hooks are mounted in the body in side-by-side relationship. Each hook may be formed from a separate length of resilient material individually anchored to the spoon-shaped body. Alternatively, these hooks may be formed from a single length of resilient material, the shank portions of the hooks being integral with a U-shaped portion of material secured to the spoon-shaped body.

Figure 2:
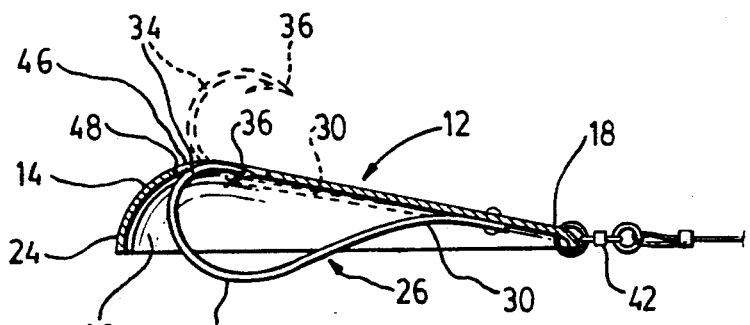
Figure 3:
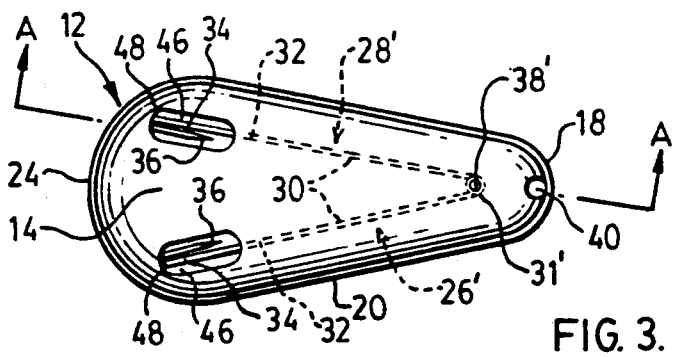
Figure 4:
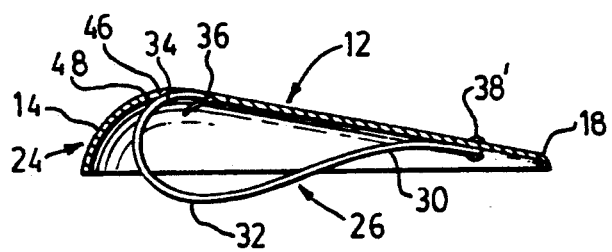

Embodiments of the invention will now be described, by way of example, with reference to the accompanying drawings, of which:

FIG. 1 is a plan view of a weedless fish lure in accordance with one embodiment of the invention, FIG. 2 is a sectional view taken along the line A-A of FIG. 1, and FIG. 3 and 4 are similar views of another embodiment.

Referring to the drawings, the weedless fish lure shown in FIGS. 1 and 2 comprises an elongated spoon-shaped body 12 defining a bulbous outer surface 14 on one side and a complementarily-shaped recess 16 on the other side. In plan view, the body 12 has a narrow curved leading end 18 from which end 24. As so far described, the spoon-shaped body is conventional.

In accordance with the invention, two resilient hooks 26, 28 of suitable spring steel are mounted in the spoon-shaped body 12. Each hook 26, 28 has a shank portion 30 at one end and extends through a medial portion 32 to a reversely bent pointed end portion 34 with a barbed end 36. In the undeflected state, as shown in dotted outline in FIG. 2, the shank portion 30 is straight.

The free end of each shank portion 30 is anchored to the spoon-shaped body 12 near its leading end 18 by a rivet 38. An aperture 40 is provided at the leading end 18 to enable the usual swivel connection 42 (shown only in FIG. 2) to be attached thereto. The hooks 26, 28 are located on opposite sides of the longitudinal centre line of the spoon-shaped body 24, and the longitudinal axes of the hooks 26, 28 diverge slightly in the direction of the trailing end 24.

As previously mentioned, the natural configuration of the hook 26 is shown in dotted outline in FIG. 2, it being understood that the description which follows in respect of hook 26 also applies to hook 28. Thus, in the natural configuration, the shank portion 30 extends in a straight line near the inner surface of the spoon-like body 12, and the pointed end portion 34 extends through an appropriately positioned slot 46 in the spoon-shaped body 12, with the barbed end 36 of the hook 26 spaced from the body 12 and directed in the general direction of the leading end 18.

In the use, the hook 26 is resiliently deflected by pushing the pointed end portion 32 through the slot 46 into the recess 16 in the spoon-shaped body 12, as shown in full lines shaped body 12.

In this deflected configuration, the pointed end portion 34 frictionally engages the end 48 of the slot 46 remote from the leading end 18, and the medial portion 32 of the hook 26 projects from the recess 16 on the other side of the spoon-shaped body 12.

While the fish lure is being pulled through the water, weeds will not become entangled or snagged on the hooks 26, 28 because the barbed ends 36 are flush with the spoon-shaped body 12. If a fish bites on the trailing end portion of the fish lure, pressure exerted on the projecting medial portion 32 of one or both hooks 26, 28 by the mouth of the fish will cause the pointed end portion 34 to be released from frictional engagement with the end 48 of the slot 46 so that the resiliency of the hook causes the barbed end 36 to be sprung to the operative position shown in full lines in FIG. 2, with the result that the fish is caught.

The embodiment shown in FIGS. 3 and 4 is the same as the embodiment shown in FIGS. 1 and 2 except that the two hooks 26', 28' are formed from a single length of spring steel. The shank portions 30' of the hooks 26', 28' are thus integral with a U-shaped portion 31' which is secured to the spoon-shaped body 12 by a single rivet 38', thereby avoiding the use of two rivets as in the previous embodiment.

The advantages of the present invention will be readily apparent to the person skilled in the art from the foregoing description of preferred embodiments. Although primarily intended as a fish lure for use in weedy waters, it has been found that a fish lure in accordance with the present invention is also very effective in relatively weed-free locations.

Other embodiments of the invention will also be readily apparent to a person skilled in the art.

I claim:

1. A weedless fish lure comprising an elongated spoon-shaped-body defining a bulbous outer surface on one side and a complementarily-shaped recess on the other side, the body having a generally longitudinally-extending slot with opposite ends, and at least one longitudinally-extending resilient hook mounted within the spoon-shaped body recess, the hook having a shank portion at one end thereof and extending therefrom through a medial portion to a pointed portion at the other end thereof, a rivet anchoring the shank portion to the spoon-shaped body to position the pointed end portion adjacent the slot so that the pointed end portion frictionally engages the end of the slot further from said shank portion anchoring rivet than the opposite end of the slot to retain the pointed end portion substantially wholly within the recess with the hook in a resiliently deflected sprung position in which the medial portion projects from the recess on the other side of the body, and so that the pointed end portion is capable of movement through the slot so as to project in a fish catching manner from the bulbous outer surface of the body when pressure is applied by the mouth of the fish to a projecting medial portion in a direction to overcome said frictional engagement and cause the resiliency of the hook to spring the pointed end portion through the slot to an unsprung fish catching position whereby said shank portion abuts said body projecting the medial portion and the pointed portion fully through said slot.

2. A weedless fish lure according to claim 1 wherein a pair of said hooks are mounted in the body in side-by-side relationship.

3. A weedless fish lure according to claim 2 wherein each hook is formed from a separate length of resilient material individually secured to the spoon-shaped body.

4. A weedless fish lure according to claim 2 wherein the two hooks are formed from a single length of resilient material, the shank portions of the hooks being integral with a U-shaped portion of material secured to the spoon-shaped body.

* * * * *